US009319534B1

(12) United States Patent
Almog

(10) Patent No.: US 9,319,534 B1
(45) Date of Patent: Apr. 19, 2016

(54) SYSTEM, METHOD, AND COMPUTER PROGRAM FOR AUTOMATICALLY GENERATING PERSONALIZED OFFERS FOR A CONSUMER IN A TELECOMMUNICATION CONSUMER NETWORK

(71) Applicant: Amdocs Software Systems Limited, Dublin (IE)

(72) Inventor: Eyal Almog, Petach Tikva (IL)

(73) Assignee: Amdocs Software Systems, Limited, Dublin (IE)

( * ) Notice: Subject to any disclaimer, the term of this patent is extended or adjusted under 35 U.S.C. 154(b) by 92 days.

(21) Appl. No.: 14/201,708

(22) Filed: Mar. 7, 2014

Related U.S. Application Data

(60) Provisional application No. 61/820,727, filed on May 8, 2013.

(51) Int. Cl.
*H04L 12/26* (2006.01)
*H04M 15/00* (2006.01)
*H04W 24/08* (2009.01)

(52) U.S. Cl.
CPC .............. *H04M 15/58* (2013.01); *H04W 24/08* (2013.01)

(58) Field of Classification Search
CPC ...... H04M 15/58; H04W 24/08; H04L 12/26; H04L 12/2602
See application file for complete search history.

(56) References Cited

U.S. PATENT DOCUMENTS

| | | | | |
|---|---|---|---|---|
| 2009/0138427 | A1* | 5/2009 | Kalavade | 707/1 |
| 2010/0048242 | A1* | 2/2010 | Rhoads et al. | 455/556.1 |
| 2011/0243553 | A1* | 10/2011 | Russell | 398/25 |
| 2012/0221716 | A1* | 8/2012 | Halevi et al. | 709/224 |
| 2013/0041758 | A1* | 2/2013 | Mikan et al. | 705/14.66 |
| 2013/0041759 | A1* | 2/2013 | Mikan et al. | 705/14.66 |
| 2013/0166690 | A1* | 6/2013 | Shatzkamer | 709/219 |
| 2013/0171960 | A1* | 7/2013 | Kandregula | 455/405 |
| 2013/0212638 | A1* | 8/2013 | Wilson | 726/1 |
| 2013/0262197 | A1* | 10/2013 | Kaulgud et al. | 705/14.1 |
| 2014/0016464 | A1* | 1/2014 | Shirazipour et al. | 370/235 |

* cited by examiner

*Primary Examiner* — Brian D Nguyen
(74) *Attorney, Agent, or Firm* — Zilka-Kotab, PC

(57) ABSTRACT

A system, method, and computer program product are provided for automatically generating personalized offers for a consumer in a telecommunication consumer network. In use, a telecommunication consumer network is automatically and continuously monitored to automatically maintain a record of patterns of consumer usage of mobile devices on the telecommunication consumer network. Additionally, the record of patterns of consumer usage of mobile devices on the consumer network is utilized to automatically generate at least one personalized offer to at least one consumer on the telecommunication consumer network, the personalized offer being associated with consumer services that are suitable for a pattern of usage of at least one mobile device associated with the at least one consumer on the telecommunication consumer network.

16 Claims, 7 Drawing Sheets

SYSTEM, METHOD, AND COMPUTER PROGRAM FOR AUTOMATICALLY GENERATING PERSONALIZED OFFERS FOR A CONSUMER IN A TELECOMMUNICATION CONSUMER NETWORK

CLAIM OF PRIORITY

This application claims the benefit of U.S. Provisional Application No. 61/820,727, filed May 8, 2013, the entire contents of which are incorporated herein by reference.

FIELD OF THE INVENTION

The present invention relates generally to network data analysis as it is reflected in the behavior of telecommunication service subscribers, for enabling subscriber personalization such as churn prediction and cross/up sell activities.

BACKGROUND

The telecommunications market is currently undergoing a fundamental shift, as consumption of IP data and video services continue to rapidly grow. Service providers are investing heavily to expand network capacity, as subscribers' satisfaction is increasingly tied to their experience while using these services. Service providers must be able to understand and predict customer behavior and experience during IP video and data consumption if they hope to obtain maximum value from their network, satisfy their customers and achieve profitability.

There is thus a need for addressing these and/or other issues associated with the prior art.

SUMMARY

A system, method, and computer program product are provided for automatically generating personalized offers for a consumer in a telecommunication consumer network. In use, a telecommunication consumer network is automatically and continuously monitored to automatically maintain a record of patterns of consumer usage of mobile devices on the telecommunication consumer network. Additionally, the record of patterns of consumer usage of mobile devices on the consumer network is utilized to automatically generate at least one personalized offer to at least one consumer on the telecommunication consumer network, the personalized offer being associated with consumer services that are suitable for a pattern of usage of at least one mobile device associated with the at least one consumer on the telecommunication consumer network.

DETAILED DESCRIPTION

Figure 1:
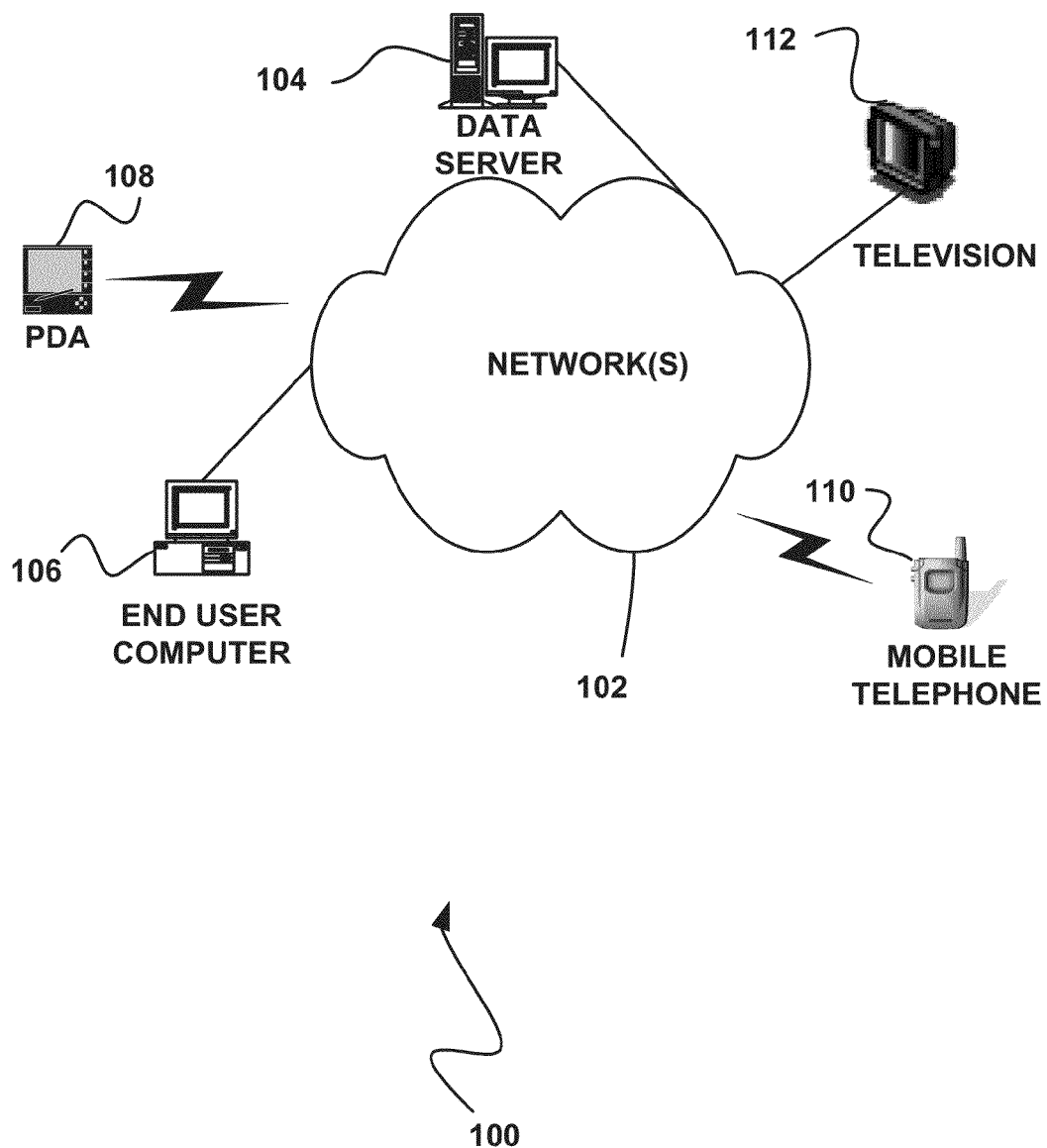
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
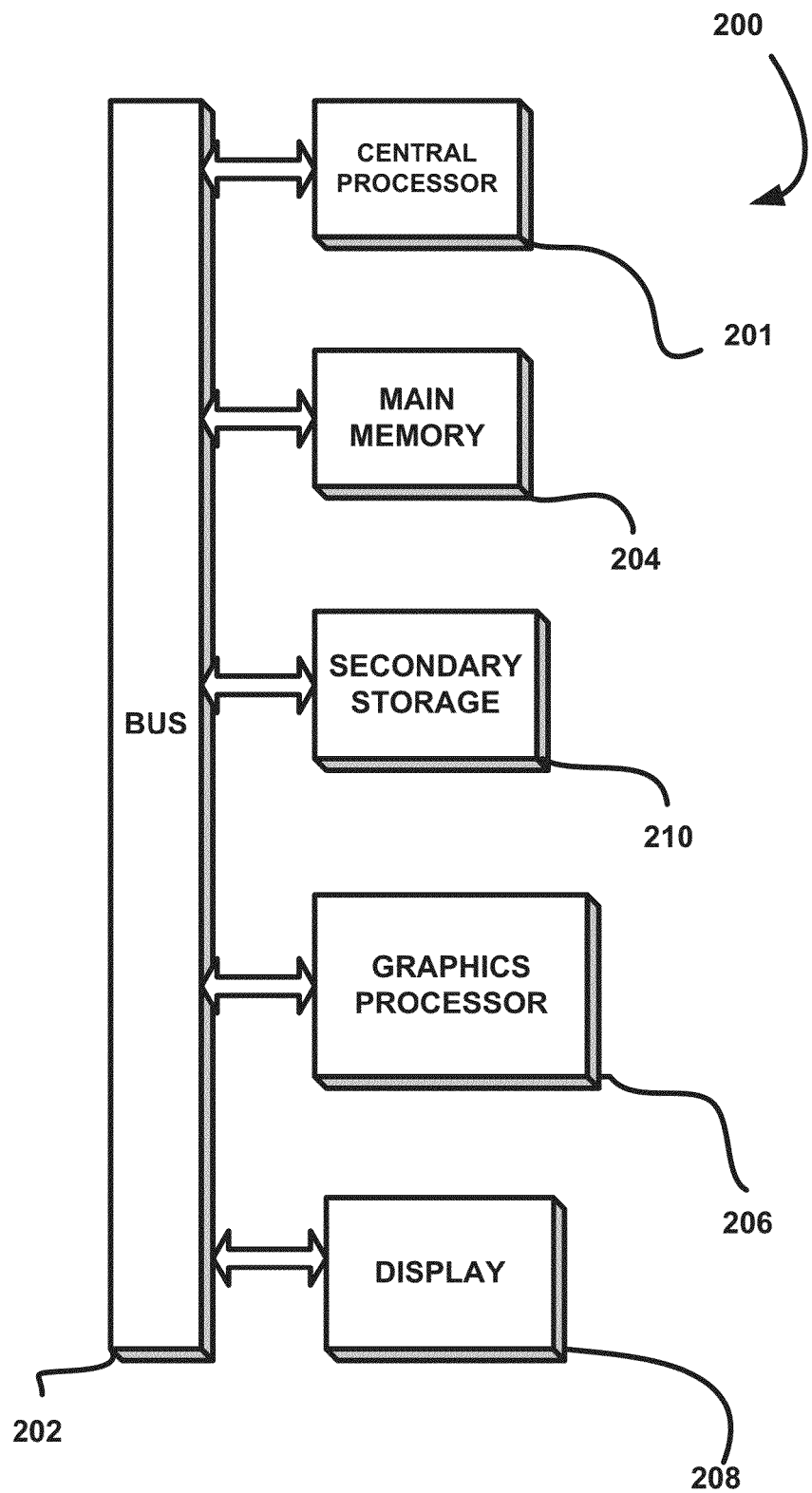
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
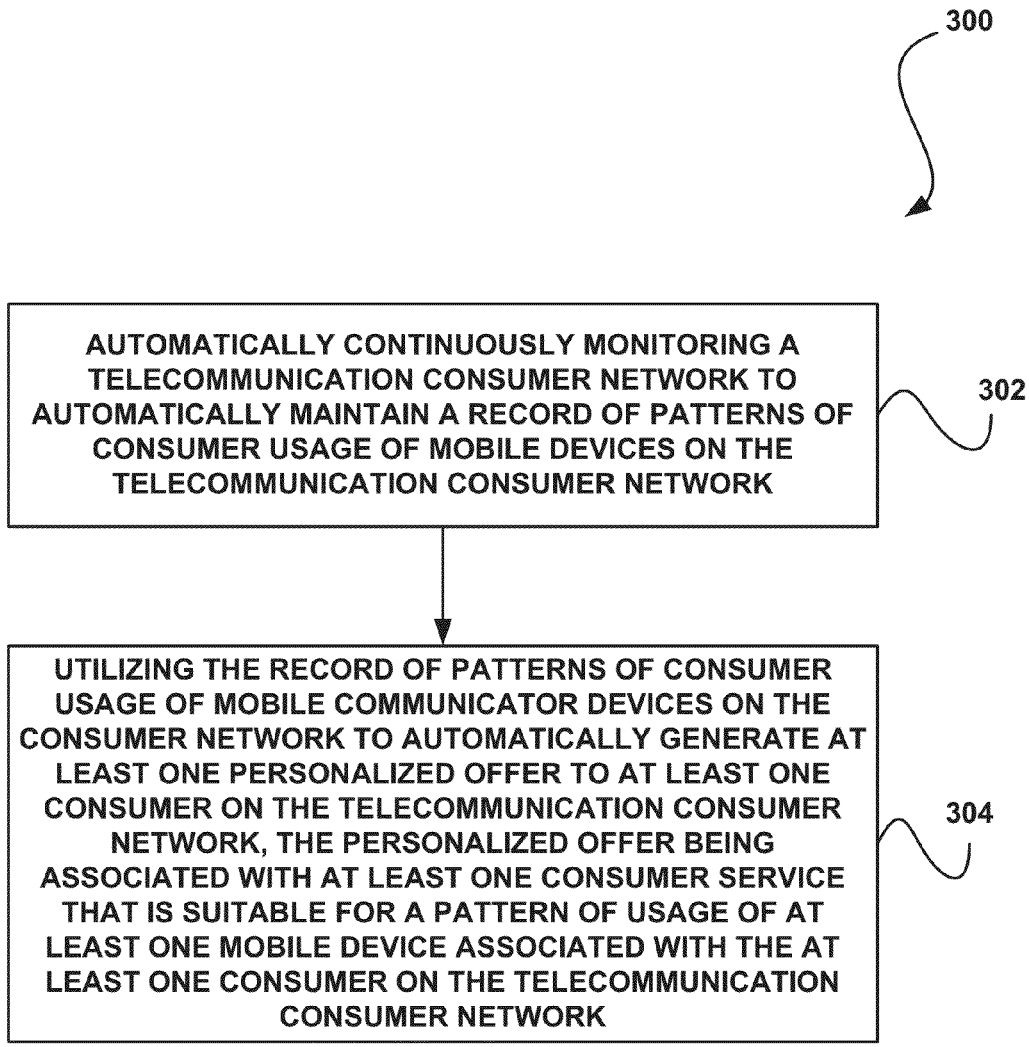
FIG. 3 illustrates a method for automatically generating personalized offers for a consumer in a telecommunication consumer network, in accordance with one embodiment.

FIG. 3 illustrates a method 300 for automatically generating personalized offers for a consumer in a telecommunication consumer network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a telecommunication consumer network is automatically and continuously monitored to automatically maintain a record of patterns of consumer usage of mobile devices on the telecommunication consumer network. See operation 302. The mobile devices may include any type of mobile device, such as a mobile phone, a tablet computer, a laptop computer, and/or any other type of mobile device.

Additionally, the record of patterns of consumer usage of mobile devices on the consumer network is utilized to automatically generate at least one personalized offer for at least one consumer on the telecommunication consumer network, the personalized offer including consumer services that are suitable for a pattern of usage of at least one mobile device associated with the at least one consumer on the telecommunication consumer network. See operation 304.

In one embodiment, automatically and continuously monitoring the telecommunication consumer network may include capturing network data usage records. Various network data usage may be captured. For example, in one embodiment, capturing the network data usage records may include capturing information associated with HTTP traffic.

In another embodiment, capturing the network data usage records may include capturing information associated with social networks. As another example, capturing the network data usage records may include capturing information associated with mobile application usage.

In another embodiment, capturing the network data usage records may include capturing information associated with email. In another embodiment, capturing the network data usage records may include capturing information associated with video streaming. As another example, capturing the network data usage records may include capturing information associated with gaming. Still yet, in one embodiment, automatically continuously monitoring the telecommunication consumer network may include capturing customer data characteristics and profiles that are not dependent only on events.

Further, in one embodiment, the captured network data usage records may be aggregated into a single event. Additionally, in one embodiment, information associated with the single event may be correlated with historical data associated with the least one consumer.

Still yet, in one embodiment, the method 300 may include collecting one or more metadata attributes associated with the consumer usage of mobile devices on the telecommunication consumer network. In this case, collecting the one or more metadata attributes associated with the consumer usage of mobile devices on the telecommunication consumer network may include collecting the one or more metadata attributes for network usage associated with the at least one consumer.

As one example, the network usage may be associated with streaming video. In this case, the one or more metadata attributes may include one or more of a source IP, a target IP, an MISDN, a start time, end time, a URL, a downlink, an uplink, a re-transmission, a jitter, and quality of service.

Further, a quality of experience score may be generated for the at least one consumer, based on the one or more metadata attributes. In this case, the method 300 may further include determining whether the quality of experience score is below a predefined threshold score.

In response to determining that the quality of experience score is below a predefined threshold score, the at least one personalized offer or at least one personalized policy change may be triggered. According to one embodiment, the at least one offer may include a specific offer associated with an increase in bandwidth for the subscriber. Of course, the offer may be associated with any aspect of the service.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
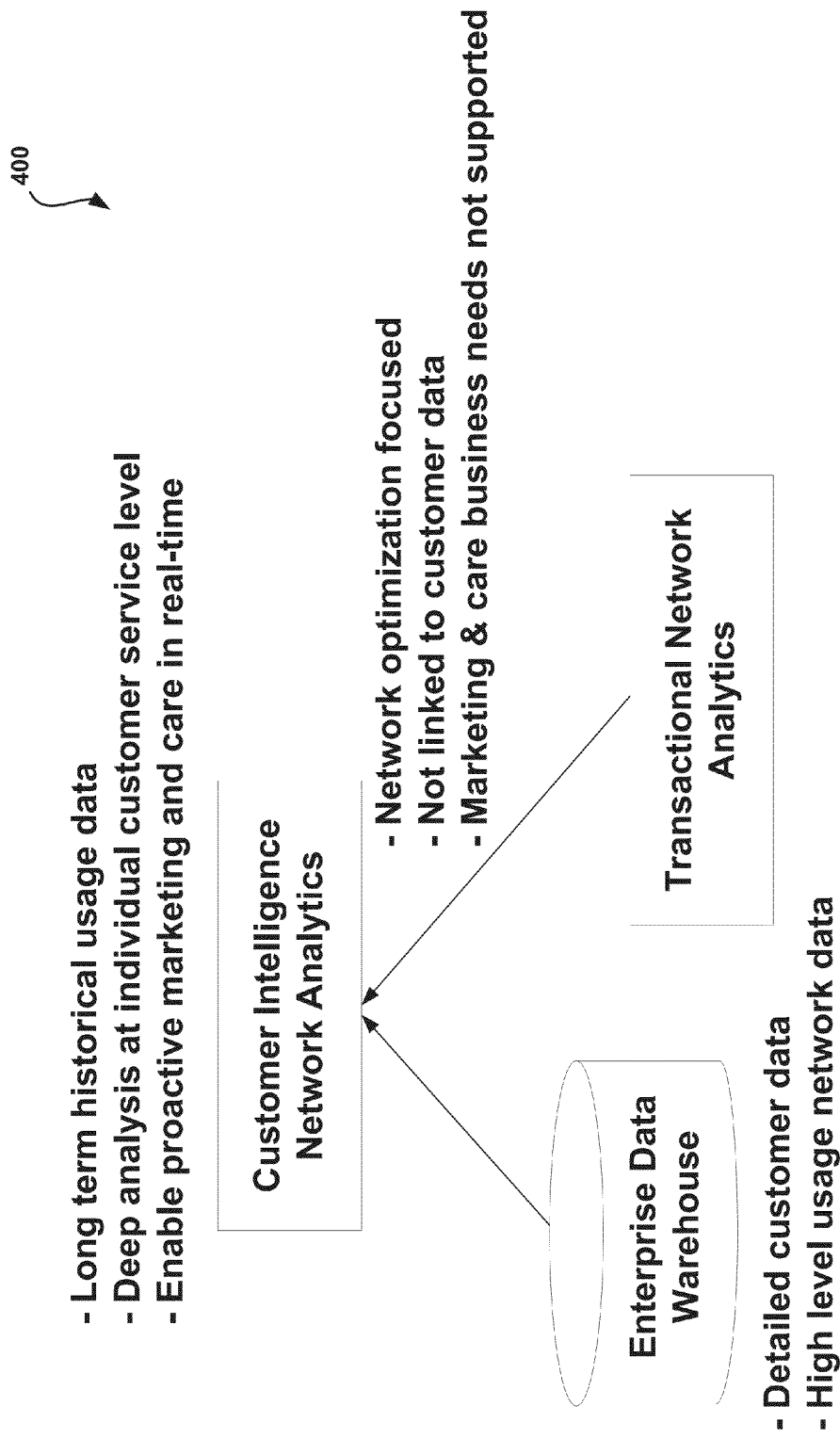
FIG. 4 illustrates a flow diagram for a holistic approach of customer intelligence network analytics, in accordance with one embodiment.

FIG. 4 illustrates a flow diagram 400 for a holistic approach of customer intelligence network analytics, in accordance with one embodiment. As an option, the flow diagram 400 may be viewed in the context of the details of FIGS. 1-3. Of course, however, the flow diagram 400 may be viewed in the context of any desired environment. Further, the aforementioned definitions may equally apply to the description below.

Telecommunication infrastructure systems typically log network data and measure quality of service (QoS), however the analysis and reports produced are focused on network elements and cannot be tied to specific subscribers. A customer-centric approach to network analytics is needed to enable service providers to measure and analyze network consumption patterns and quality of experience (QoE) at the individual customer level, per data session, for each application and service used.

Quality of experience measures the user experience. For example, quality of experience may indicate whether a user had a good experience during video streaming or whether the video suffered from time delay and poor audio or visual quality.

Accordingly, in one embodiment, the insights gained from customer-centric network analytics may be used to drive personalized campaigns and customer care. For example, a customer who is identified as consistently having poor quality of experience during video streaming can be proactively presented with an offer to upgrade to a more robust broadband package. A heavy user of mobile gaming and video chat from third-party providers can be provided with an offer for a personalized package from the service provider and its partners with guaranteed quality of service.

Using this technique enables service providers to understand customer behavior and experience and to leverage these insights to trigger personalized offers and customer care actions. This analytical solution is enabled by the steps illustrated in FIG. 5.

Figure 5:
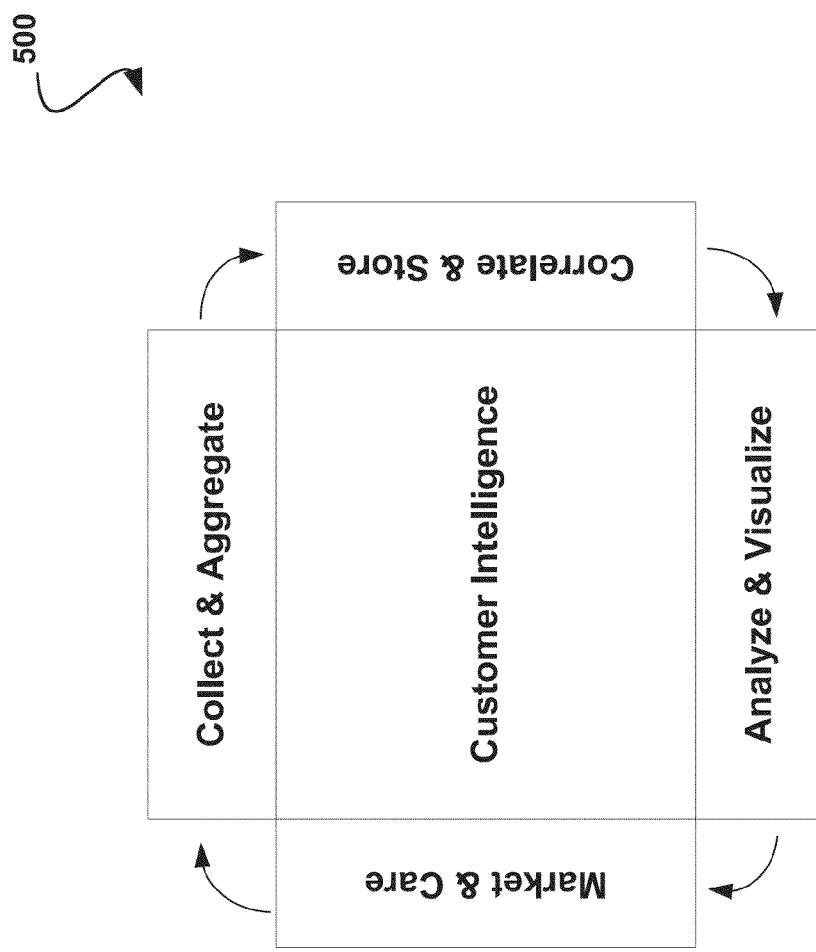
FIG. 5 illustrates a flow diagram for automatically generating personalized offers for a consumer in a telecommunication consumer network, in accordance with one embodiment.

FIG. 5 illustrates a diagram 500 for automatically generating personalized offers for a consumer in a telecommunication consumer network, in accordance with one embodiment. As an option, the diagram 500 may be implemented in the context of the details of FIGS. 1-4. Of course, however, the diagram 500 may be implemented in the context of any desired environment. Further, the aforementioned definitions may equally apply to the description below.

As shown in FIG. 5, the flow includes a collect and aggregate step, a correlate and store step, an analyze and visualize step, and a market and care step. As part of the collect and aggregate step, network data usage records are captured. In various embodiments, the network data usage records captured may include HTTP traffic, social network information, mobile application usage information, email information, and video streaming and gaming information, etc. Furthermore, the captured information is aggregated into a single meaningful event.

As part of the correlate and store step, the device data is correlated with customer data from one or more business support systems (BSS) and data warehouses. This correlated data is stored in a database.

As part of the analyze and visualize step, advanced analytics, visualization and navigation with user defined dashboards and reports are exposed (e.g. to a user utilizing a user interface, etc.). As part of the market and care step, actions are created based on the data, such as retention or up/cross sell.

One example of this flow includes a customer watching a movie. In this case, metadata attributes may be collected during the video streaming. Such metadata attributes may be, for example, source IP, target IP, MISDN, start time, end time, URL, downlink, uplink, re-transmission, jitter and quality of service. Those attributes may be used to describe the video and the quality of experience of the subscriber. That quality of experience score may be compared to the subscriber profile that is kept in a historical database.

If the score is below a predefined threshold, a system may send customer care a specific offer for the subscriber, which may increase the subscriber's bandwidth. Further, service activation may be enabled via the device.

Figure 6:
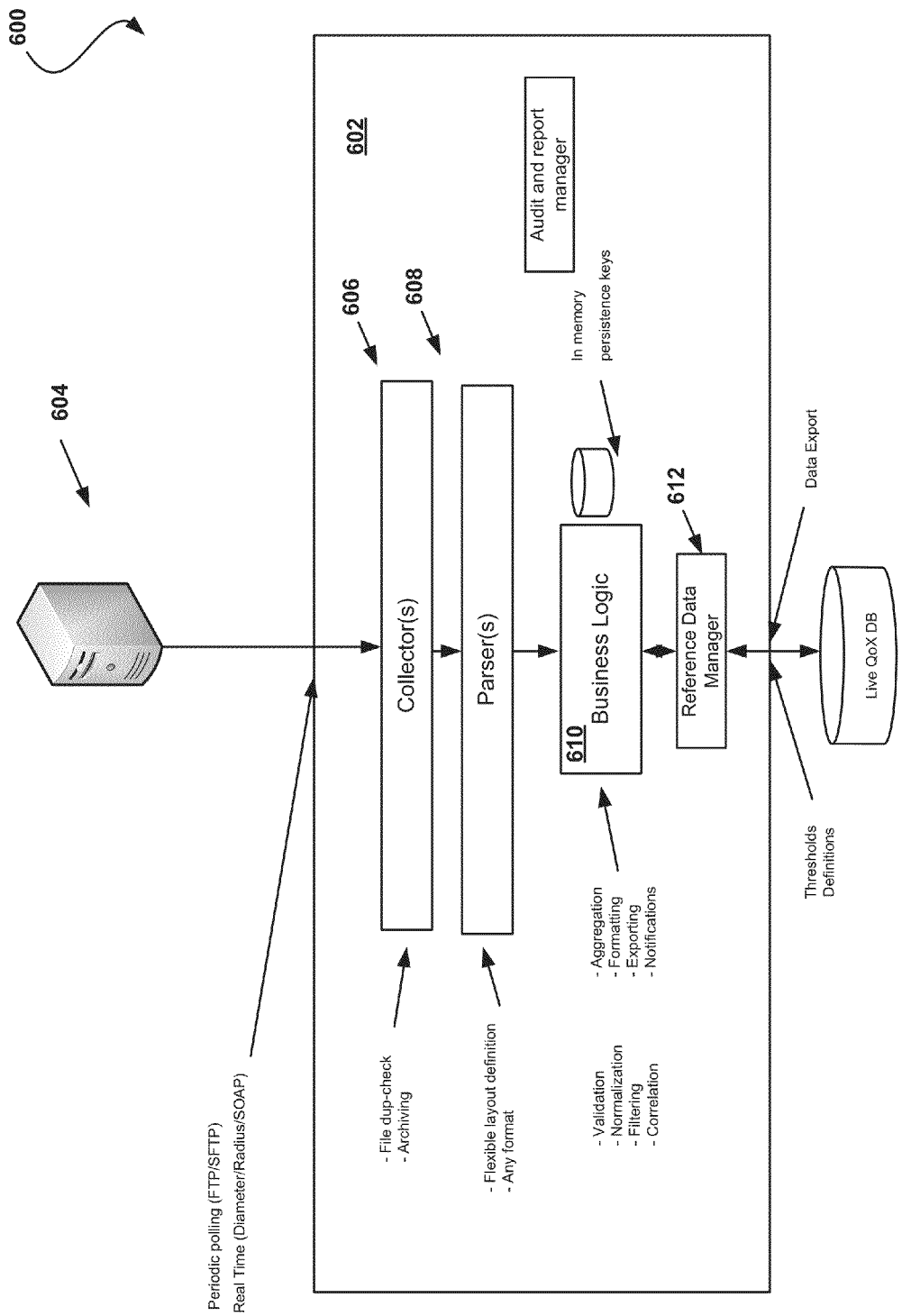
FIG. 6 illustrates a system for automatically generating personalized offers for a consumer in a telecommunication consumer network, in accordance with one embodiment.

FIG. 6 illustrates a system 600 for automatically generating personalized offers for a consumer in a telecommunication consumer network, in accordance with one embodiment. As an option, the system 600 may be implemented in the context of the details of FIGS. 1-5. Of course, however, the system 600 may be implemented in the context of any desired environment. Further, the aforementioned definitions may equally apply to the description below.

FIG. 6 illustrates how a platform 602 may integrate with all types of networks, such as packet-switched networks and circuit-switched networks, including fixed, mobile, cable, satellite and next-generation networks. The system 600 also supports all types of services, including voice, VoIP, data, content and video services.

The platform 602 may collect usage data, utilizing collectors 606, from both data and voice networks from a variety of network elements 604, such as switches, routers, firewalls, proxy servers, mail servers, directory servers, optimization servers and application servers.

The collected information may then be parsed, utilizing parsers 608, and aggregated using business logic 610 to a complete view of network activity detailing the parameters of every session. Then, using a reference data manager 612, the network event may be correlated with customer data and loaded into a data base scheme.

Figure 7:
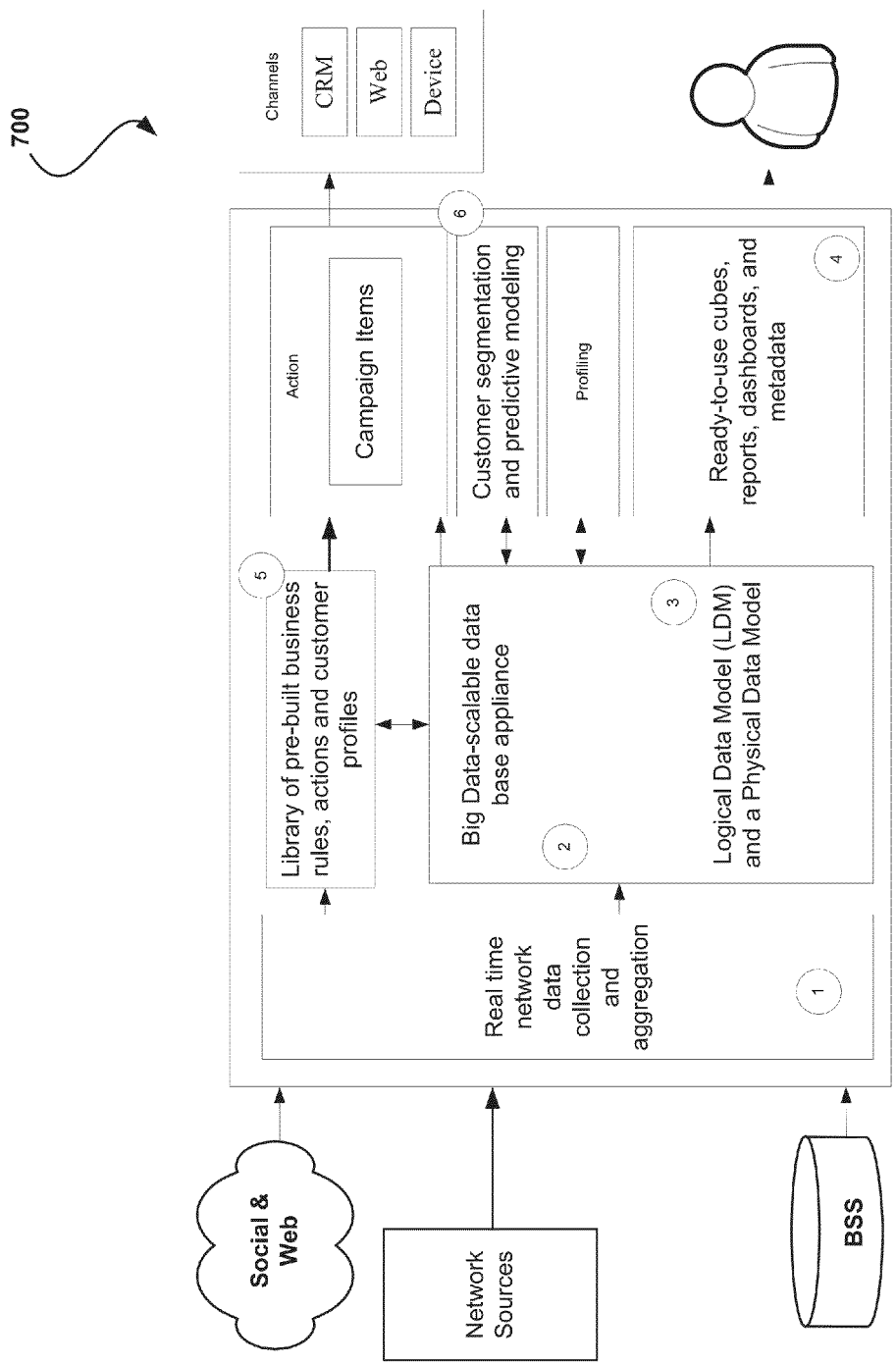
FIG. 7 illustrates a system architecture for automatically generating personalized offers for a consumer in a telecommunication consumer network, in accordance with one embodiment.

FIG. 7 illustrates a system architecture 700 for automatically generating personalized offers for a consumer in a telecommunication consumer network, in accordance with one embodiment. As an option, the system architecture 700 may be implemented in the context of the details of FIGS. 1-6. Of course, however, the system architecture 700 may be implemented in the context of any desired environment. Further, the aforementioned definitions may equally apply to the description below.

As illustrated in FIG. 7, the architecture 700 of the system may include various components for complete analytics coverage. For example, the architecture 700 may include real time network data collection and aggregation (1). Additionally, the architecture 700 may include a Big Data-scalable data base appliance (2).

Further, the architecture 700 may include a Logical Data Model (LDM) and a Physical Data Model, including a predefined mapping to simplify the complexity of integrating customer and network data (3). In addition, the architecture 700 may include ready-to-use cubes, reports, dashboards, and metadata for deep analysis and visualization (4).

Still yet, the architecture 700 may include a library of pre-built business rules, actions and customer profiles (5). Moreover, in one embodiment, the architecture 700 may include customer segmentation and predictive modeling drive action recommendations (6).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    automatically continuously monitoring a telecommunication consumer network to automatically maintain a record of patterns of consumer usage of mobile devices on the telecommunication consumer network;
    collecting one or more metadata attributes associated with the consumer usage of mobile devices on the telecommunication consumer network;
    generating a quality of experience score for at least one consumer, based on the one or more metadata attributes;
    comparing the quality of experience score to a predefined threshold score;
    upon determining that the quality of experience score is below the predefined threshold score, triggering a generation of at least one personalized offer for the at least one consumer on the telecommunication consumer network utilizing the record of patterns of consumer usage of mobile devices on the consumer network, the personalized offer being associated with at least one consumer service that is suitable for a pattern of usage of at least one mobile device associated with the at least one consumer on the telecommunication consumer network.

2. The computer program product of claim 1, wherein the computer program product is operable such that automatically continuously monitoring the telecommunication consumer network includes capturing network data usage records.

3. The computer program product of claim 2, wherein the computer program product is operable such that capturing the network data usage records includes capturing information associated with HTTP traffic.

4. The computer program product of claim 2, wherein the computer program product is operable such that capturing the network data usage records includes capturing information associated with social networks.

5. The computer program product of claim 2, wherein the computer program product is operable such that capturing the network data usage records includes capturing information associated with mobile application usage.

6. The computer program product of claim 2, wherein the computer program product is operable such that capturing the network data usage records includes capturing information associated with email.

7. The computer program product of claim 2, wherein the computer program product is operable such that capturing the network data usage records includes capturing information associated with video streaming.

8. The computer program product of claim 2, wherein the computer program product is operable such that capturing the network data usage records includes capturing information associated with gaming.

9. The computer program product of claim 2, further comprising computer code for aggregating the captured network data usage records into a single event.

10. The computer program product of claim 9, further comprising computer code for correlating information associated with the single event with historical data associated with the least one consumer.

11. The computer program product of claim 1, wherein the computer program product is operable such that collecting the one or more metadata attributes associated with the consumer usage of mobile devices on the telecommunication consumer network includes collecting the one or more metadata attributes for network usage associated with the at least one consumer.

12. The computer program product of claim 11, wherein the computer program product is operable such that the network usage is associated with streaming video.

13. The computer program product of claim 12, wherein the computer program product is operable such that the one or more metadata attributes include one or more of a source IP, a target IP, an MISDN, a start time, end time, a URL, a downlink, an uplink, a re-transmission, a jitter, and quality of service.

14. The computer program product of claim 1, wherein the computer program product is operable such that automatically continuously monitoring the telecommunication consumer network includes capturing customer data characteristics and profiles that are not dependent only on events.

15. A method, comprising:
  automatically continuously monitoring a telecommunication consumer network to automatically maintain a record of patterns of consumer usage of mobile devices on the telecommunication consumer network;
  collecting one or more metadata attributes associated with the consumer usage of mobile devices on the telecommunication consumer network;
  generating a quality of experience score for at least one consumer, based on the one or more metadata attributes;
  comparing the quality of experience score to a predefined threshold score;
  upon determining that the quality of experience score is below the predefined threshold score, triggering a generation of at least one personalized offer for the at least one consumer on the telecommunication consumer network utilizing the record of patterns of consumer usage of mobile devices on the consumer network, the personalized offer being associated with at least one consumer service that is suitable for a pattern of usage of at least one mobile device associated with the at least one consumer on the telecommunication consumer network.

16. A system comprising:
  a memory system; and
  one or more processing cores coupled to the memory system and that are each configured for:
  automatically continuously monitoring a telecommunication consumer network to automatically maintain a record of patterns of consumer usage of mobile devices on the telecommunication consumer network;
  collecting one or more metadata attributes associated with the consumer usage of mobile devices on the telecommunication consumer network;
  generating a quality of experience score for at least one consumer, based on the one or more metadata attributes;
  comparing the quality of experience score to a predefined threshold score;
  upon determining that the quality of experience score is below the predefined threshold score, triggering a generation of at least one personalized offer for the at least one consumer on the telecommunication consumer network utilizing the record of patterns of consumer usage of mobile devices on the consumer network, the personalized offer being associated with at least one consumer service that is suitable for a pattern of usage of at least one mobile device associated with the at least one consumer on the telecommunication consumer network.

* * * * *